3,397,229
NITRATION OF BENZOIC ACID AND ITS
CHLORINATED DERIVATIVES
Eldred Welch, Westfield, N.J., assignor to GAF
Corporation, a corporation of Delaware
No Drawing. Filed Dec. 4, 1963, Ser. No. 328,061
9 Claims. (Cl. 260—515)

The present invention relates to an improved method for the nitration of benzoic acid and the mono-chloro and poly-chloro derivatives thereof.

Of the several nitrated benzenoid acids, 2,5-dichloro-3-nitrobenzoic acid is one of the most important. It is useful as a herbicide and also as an intermediate for the preparation of 2,5-dichloro-3-aminobenzoic acid, also a herbicide and a pre-emergence weed-killer in soybeans. The conventional process for nitrating 2,5-dichlorobenzoic acid, as currently practiced, consists of dissolving the acid in sulfuric acid of 95–98% concentration and adding a mixed acid consisting of 33% nitric acid and 67% sulfuric acid, after which the crude nitrated product is precipitated by drowning in water. In this process, because of the rather poor solubility of the nitrated compound, a large amount of sulfuric acid is required to keep a sufficient quantity of the nitrated compound in solution so that the mass can be agitated well enough to allow the proper reaction to take place. The formation of one mole of water for every mole of the 2,5-dichlorobenzoic acid nitrated, as shown in Equation 1, lowers the effective concentration of the sulfuric acid solvent, thus decreasing the solubility of the resulting compound.

(1) 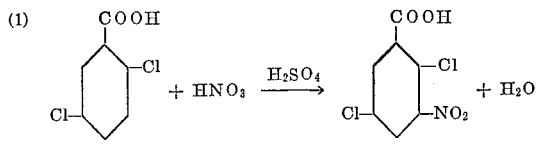

At the optimum temperature for the reaction a weight ratio of total sulfuric acid as 100% to 2,5-dichlorobenzoic acid of about 6.1–8.1:1 is required, the exact ratio depending on the purity of the acid used. If this ratio is lowered, the reaction mass becomes heavier making agitation less effective and resulting in a lower yield.

The weight ratio of 6.1:1 (11.9 moles to 1 mole) applies to a 2,5-dichlorobenzoic acid having a purity of about 95%, while the weight ratio of 8.1:1 (15.8 moles to 1 mole) applies to one with a purity of about 70%. It is very difficult and prohibitively expensive to produce 2,5-dichlorobenzoic acid with a purity much above 95%. It is also uneconomical to nitrate 2,5-dichlorobenzoic acid with a purity much below 70%.

It is the principal object of the present invention to provide an improved and more economical process of nitrating benzoic acid and its mono- and poly-chloro derivatives wherein the ratio of total sulfuric acid to the benzoic acid or its chlorinated derivatives is drastically reduced without reduction in yield of the nitrated product.

Other objects and advantages will become evident from the following description.

I have found that by the use of oleum containing about 65% (from 63–67%) free sulfur trioxide, i.e., a 63–67% solution of sulfur trioxide in 100% sulfuric acid, in the nitration reaction, the water formed therein reacts with the oleum yielding concentrated sulfuric acid, as shown in Equation 2, which maintains the effective concentration of the sulfuric acid as solvent for the nitrated 2,5-dichlorobenzoic acid and prevents it from decreasing during the nitration, thus preserving its solvent power and making it possible to increase the charge of the 2,5-dichlorobenzoic acid for a given amount of sulfuric acid, including sulfur trioxide calculated as sulfuric acid. The ratio of the moles of free sulfur trioxide in the oleum and the moles of 2,5-dichlorobenzoic acid (and its associated chlorinated derivatives) is about 1:1.

(2) 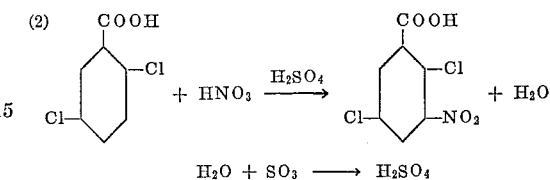

$$H_2O + SO_3 \longrightarrow H_2SO_4$$

By the foregoing means, the weight ratio of total sulfuric acid to the 2,5-dichlorobenzoic acid is drastically reduced from 6.1–8.1:1 (by moles from 11.9–15.8:1) to 3.3–4.5:1 (by moles from 6.5–8.8:1) without a decrease in yield of the nitrated product. In fact, the yield is increased by a small but significant amount as will be noted from the illustrative working examples.

The process of the present invention has several economic advantages. There are considerable savings in raw material costs in view of the decrease in sulfuric acid consumption and in view of the lower consumption of an alkaline material, usually hydrated lime, used for the neutralization of the spent acid before the spent liquors can be discarded. The use of oleum allows for the charging of a larger amount of material in a given size equipment, which results in a larger production from the equipment with less manpower required per pound of product. The principal advantage is that the sulfuric acid concentration is kept from decreasing, which allows for a greater solubility of the nitrated dichlorobenzoic acid, resulting in the consumption of less acid for a given change of 2,5-dichlorobenzoic acid and a slightly higher yield.

In practicing the invention, as it relates to 2,5-dichlorobenzoic acid, the method consists of first dissolving the 2,5-dichlorobenzoic acid in sulfuric acid of about 90–100% strength or of forming the 2,5-dichlorobenzoic acid in situ by hydrolysis of the corresponding acid chloride, and then treating the resulting solution at a temperature of 50–60° C. by addition of a mixed acid consisting of 33% ntiric acid and 67% sulfuric acid and of oleum containing about 65% free sulfur trioxide. The amount of mixed acid added is that quantity which contains slightly more than the theoretical weight of nitric acid and the amount of free sulfur trioxide added as oleum is the theoretical amount to react with the water formed during the nitration. The amount of sulfur trioxide introduced as oleum can be up to twice the theoretical amount without adversely affecting the yield or quality of the product. An amount larger than the theoretical, however, adds to the sulfuric acid to be discarded without advantageously affecting the reaction. When the nitration is complete, the reaction mass is drowned in water to precipitate a crude product, which is then purified by the usual methods, such as recrystallization or pH fractionation.

It is not necessary that the sulfuric acid have a concentration of 100% at the start of the reaction. It can be as low as 90% but for the greatest solubility of the nitrated 2,5- dichlorobenzoic acid, it should be between 90–100%, preferably near 100% or even have some free sulfur trioxide in it. The oleum addition can be started before, at the same time as, or after the addition of the mixed acid. It can also be added intermittently as well as continuously. It is possible to carry out the reaction with satisfactory results if the mixed acid is added intermittently with intermittent or continuous addition of oleum. It is important, however, that near the end of the reaction that the concentration of the solvent (sulfuric acid) be not lower than about 100% (not considering the nitrated material present) so that its solubility power will be great.

The temperature of 50–60° C. is preferred for the reaction but it does not have to be limited to this range. A temperature as low as about 40° C. can be used, but in this case the solubility of the product is less. A temperature up to 80° C. or even higher can be used but there is very little advantage in using a temperature much above 60° C. because of by-product formation.

The nitric acid content of the mixed acid can be varied as well as the sulfur trioxide content of the oleum, but it is important that the relative proportions of sulfur trioxide, nitric acid and total sulfuric acid (including that used for dissolving the dichlorobenzoic acid) be rather closely maintained so that the sulfuric acid strength will decrease very little below 100%. The particular mixed acid and oleum preferred are readily commercially available and perform satisfactorily for the reaction.

It is surprising that there is not a large amount of sulfonation of the 2,5-dichlorobenzoic acid taking place as a result of adding oleum to the reaction mass, because high strength oleums are powerful sulfonating agents. However, this does not happen in this case as shown by the fact that the yield of product is at least equal to that obtained in the normal nitration process in which no oleum is used.

The 2,5-dichlorobenzoic acid is prepared most readily from the corresponding dichlorobenzoyl chloride, which in turn is prepared by the chlorination of benzoyl chloride followed by rectification. The acid chloride can be hydrolyzed by any of the known methods to the acid. One satisfactory method for hydrolyzing an acid chloride is by treatment with sulfuric acid containing at least enough water to react with the acid chloride. Thus, it is obvious that there would be advantages in charging dichlorobenzoyl chloride into sulfuric acid containing an amount of water at least large enough to hydrolyze the acid chloride and then nitrating the in situ formed carboxylic acid. As far as the nitration process is concerned, it does not matter whether the carboxylic acid is formed in situ or whether it is prepared separately and dissolved in the sulfuric acid.

The following examples will illustrate the improvement by the use of oleum in the nitration reaction.

Example I

The following process is essentially illustrative of the method as currently practised when employing 2,5-dichlorobenzoic acid of about 70% purity.

A 2 liter flask was charged with 1240 grams of 96% sulfuric acid and 260 grams of 2,5-dichlorobenzoyl chloride (71.5% by assay). After the hydrolysis, the temperature was adjusted to 55–60° C., and 282 grams of mixed acid (67% sulfuric acid, 33% nitric acid) was added keeping the temperature at 55–60° C. by means of external cooling. (The weight ratio of total sulfuric acid to 2,5-dichlorobenzoic acid is 8.1:1 or 15.8:1 by moles.) After the reaction was complete, the reaction mass was poured into water, letting the temperature rise to about 60° C. to precipitate the crude material. After filtering and washing, the product was purified by pH fractionation.

The yield of 2,5-dichloro-3-nitrobenzoic acid was 63.0% effective from the 2,5-dichlorobenzoyl chloride with a melting point of 215.0–216.5° C. (M.P. reported=220° C., Hodgson and Beard, J. Chem. Soc. 1927, 2381).

The 6-nitro isomer can be isolated from the liquors if desired.

Example II

The nitration of Example I was repeated with the exception that the acid chloride charge was increased by 20% to 312 gms. and the mixed acid was increased proportionately to 339 grams. (The weight ratio of sulfuric acid to 2,5-dichlorobenzoic acid is 6.95:1 or 13.6:1 by moles.)

The yield was 52.3% effective from the 2,5-dichlorobenzoyl chloride with a melting point of 215.1–218.5° C.

This example illustrates that if the weight ratio of total sulfuric acid to the 2,5-dichlorobenzoic acid is lowered from 8.1:1 to 6.95:1 by increasing the charge of the 2,5-dichlorobenzoyl chloride by 20% and increasing proportionately the charge of mixed acid, the yield is reduced by 11%.

From the foregoing processes it is evident that in order to obtain the best possible effective yield, 63%, it is necessary to maintain the weight ratio of total sulfuric acid to the 2,5-dichlorobenzoic acid at not less than 8.1:1.

Example III

A 2 liter flask was charged with 490 grams 90.6% sulfuric acid and 520 grams 2,5-dichlorobenzoyl chloride (71.5% by assay). After hydrolysis, the temperature was adjusted to 53–57° C. There was then added simultaneously 502 grams of mixed acid (33% nitric acid, 67% sulfuric acid) and 306 grams oleum containing 65% free sulfur trioxide. The temperature was maintained at 53–57° C. by means of external cooling. (The weight ratio of total sulfuric acid to dichlorobenzoic acid is 3.33:1 or 6.5:1 by moles.) After the reaction was complete, the reaction mass was poured into water, letting the temperature rise to about 60° C. to precipitate the crude product. After filtering and washing, the product was purified by pH fractionation.

The yield was 65.0% effective from the 2,5-dichlorobenzoyl chloride M.P.=215.7–218.6° C.

The foregoing example clearly illustrates the improvement by the use of oleum wherein the ratio of moles of free sulfur trioxide in the oleum and the moles of 2,5-dichlorobenzoic acid (and its associated chlorinated derivatives) is approximately 1:1. By such use the weight ratio of total sulfuric acid to the 2,5-dichlorobenzoic acid is drastically reduced from 8.1:1 to 3.33:1 whereby considerable saving is effected in the decreased sulfuric acid consumption.

Example IV

A 2 liter flask was charged with 649 grams of 92.7% sulfuric acid and 520 grams of 2,5-dichlorobenzoyl chloride (71.5% by assay). After the hydrolysis, the nitration, work-up and purification was done as described in Example III. (The weight ratio of total sulfuric acid to dichlorobenzoic acid is 3.8:1 or 7.4:1 by moles.)

The yield was 65.0% effective from the 2,5-dichlorobenzoyl chloride. M.P.=215.5–218.6° C.

The foregoing two examples show the increased output from the same equipment as in Example I except that the charge of 2,5-dichlorobenzoyl chloride was doubled.

Example V

This example is essentially illustrative of the method as currently practiced when employing 2,5-dichlorobenzoic acid of about 95% purity:

A 250 cc. flask was charged with 124 grams of 96% sulfuric acid and 26 grams of 2,5-dichlorobenzoyl chloride (94.7% by assay). After the hydrolysis, the temperature was adjusted to 55° C. and 28.25 grams of mixed acid (33% nitric acid, 67% sulfuric acid) was added at 53–57° C. (The weight ratio of sulfuric acid 100% to 2,5-dichlorobenzoic acid is 6.1:1 or 11.9:1 by moles.)

When the reaction was finished, the reaction mixture was poured into water. The crude product was removed by filtration at about 60° C. It was then purified by pH fractionation.

The yield was 67% effective from 2,5-dichlorobenzoyl chloride with a melting point of 215.9–218.9° C.

Example VI

A 1-liter flask was charged with 488 grams of 95.3% sulfuric acid and 260 grams of 2,5-dichlorobenzoyl chloride (94.7% by assay). After the acid chloride was hydrolyzed, the temperature was adjusted to 53–57° C. There were then added simultaneously 251 grams of mixed acid (33% nitric acid, 67% sulfuric acid) and 153 grams of oleum (65% free sulfur trioxide) while keeping the temperature at 53–57° C. by external cooling. (The weight ratio of sulfuric acid to 2,5-dichlorobenzoic is 3.6:1 or 7.0:1 by moles.) After the reaction, the mass was poured into water and filtered at about 60° C. The purified product was obtained by pH fractionation.

The yield was 67.9% effective from the 2,5-dichlorobenzoyl chloride with a melting point of 216.2–219.7° C.

The above example shows the improvement by the use of oleum containing 65% free sulfur dioxide whereby the weight ratio of total sulfuric acid to the 2,5-dichlorobenzoic acid is drastically reduced from the required 6.1:1 (as in Example V) to 3.6:1. The economy in the decreased sulfuric acid consumption is evident.

Example VII

A 2-liter flask was charged with 886 grams of 94.8% sulfuric acid and 520 grams of 2,5-dichlorobenzoyl chloride (71.5% by assay). After the acid chloride was hydrolyzed, the temperature was adjusted to 40–45° C. There were then added 502 grams of mixed acid (33% nitric acid, 67% sulfuric acid) and 305 grams of oleum (65% free sulfur trioxide) while keeping the temperature at 40–45° C. by means of external cooling. (The weight ratio of sulfuric acid to 2,5-dichlorobenzoic is 4.5:1 or 8.8:1 by moles.) One hour after the acids were all in, the mass was drowned in 5000 cc. of water, filtered at 60° C. and the filter cake washed with 1200 cc. water. The crude product was purified by pH fractionation.

The yield was 68% effective from the 2,5-dichlorobenzoyl chloride with a melting point of 216.5–219.5° C.

The foregoing example shows that by the use of oleum containing 65% free sulfur trioxide, a larger amount of the charging material can be used in a given size of equipment with a larger production of the desired product and that a lower nitration temperature (40–45° C.) can be used without adversely affecting the yield.

Instead of adding the oleum (65% free sulfur trioxide) and the mixed acid at the same time to the sulfuric acid solution of the 2,5-dichlorobenzoic acid, additional advantages are obtained by the use of a previously prepared solution of mixed acid and oleum (65% free sulfur trioxide) as the nitrating agent. The sulfur trioxide present in the nitrating agent should be at least nearly molecular equivalent to the organic acid to be nitrated in order to keep the concentration of the sulfuric acid from decreasing during the nitration, thus preserving its solubilizing power. The nitric acid should be at least slightly more than the theoretical quantity. Excessive quantities of nitric acid and of sulfur trioxide do not deleteriously affect the reaction and can be used, but, since the advantages of this invention can be realized without the use of excessive quantities of either or both of these agents, they are not necessary.

In employing the foregoing modification, 2,5-dichlorobenzoic acid is dissolved in sulfuric acid of about 90–100% strength to form a mass. At a temperature of 50–60° C. a solution made by previously mixing mixed acid (33% nitric acid, 67% sulfuric acid) and oleum (65% free sulfur trioxide) is added to the agitated mass. The amount of mixed acid used is that quantity which contains slightly more than the theoretical weight of nitric acid and the amount of oleum used is that quantity which contains the theoretical amount of free sulfur trioxide to react with the water formed during the nitration.

It is possible to add 2,5-dichlorobenzoic acid to the nitrating mixture to carry out the reaction, but I prefer to reverse this operation. When the nitration is complete, the reaction mass is drowned in water to precipitate a crude product, which can be purified by the usual methods, such as recrystallization or pH fractionation.

The nitrating agent is conveniently made from the commercially available oleum containing 65% free sulfur trioxide and mixed acid containing 33% nitric acid and 67% sulfuric acid. Other mixed acids and oleums can be used for this purpose, as well as sulfuric acid, nitric acid and sulfur trioxide, but the mixed acid and oleum as described above are very satisfactory.

The use of a solution of mixed acid and oleum offers advantages beyond those offered by the use of these two materials separately. One outstanding advantage is that there is less heat evolved during the nitration. Another advantage is that the solution is non-fuming, simplifying the handling problem and decreasing corrosion. A third advantage is that only one storage tank (and auxiliary equipment) is needed instead of two. A fourth advantage is that the operation of adding one liquid is simpler than adding two.

There is considerable heat evolved when mixed acid and oleum are contacted. This heat evolution is apparently due to the formation of nitryl hydrogen sulfate according to the following equation:

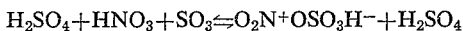
$$H_2SO_4 + HNO_3 + SO_3 \rightleftharpoons O_2N^+OSO_3H^- + H_2SO_4$$

The nitronium ion has been postulated to be the actual nitrating agent when a nitration is carried out using nitric acid in sulfuric acid. Thus the nitration of 2,5-dichlorobenzoic acid with the oleum-mixed acid nitrating agent may be shown by the following equation:

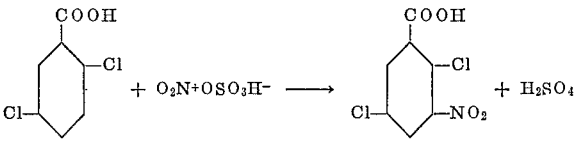

It is believed that the following equation represents essentially the system present in mixed acid:

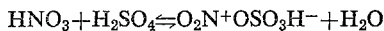
$$HNO_3 + H_2SO_4 \rightleftharpoons O_2N^+OSO_3H^- + H_2O$$

When this system is used to nitrate an aromatic compound, one of the products is water, since the equilibrium would be shifted to the right at $O_2N^+$ is consumed. If oleum is used with this system the water reacts with the sulfur trioxide present to form sulfuric acid. This reaction is very exothermic. Thus, it can be easily understood that a nitration done with a mixture of mixed acid and oleum would be considerably less exothermic than one done with oleum and mixed acid not premixed.

Since the sulfur trioxide in the oleum is reacted to a very large extent with the nitric acid of the mixed acid, the resulting solution is non-fuming. This is in great contrast to oleum, which fumes very badly, presenting health, handling and corrosion problems.

The advantages of a single solution nitrating agent over a system which uses two solutions for the nitration are important. The single solution nitrating agent requires only one-half as much storage and handling equipment as does the two solution system. The use of a single solution makes the process less complicated to carry out and decreases greatly the chance for operational errors which result in low yields and low quality product.

Example VIII

A 2-liter flask was charged with 886 grams of 94.7% sulfuric acid and with the temperature at 45–50° C. there were added 520 grams of 2,5-dichlorobenzoyl chloride (71.4% by assay). After the hydrolysis of the acid chloride was complete, there was added at 55–60° C. a solution made by mixing 305 grams oleum (65% free sulfur trioxide) and 502 grams mixed acid (33% nitric acid, 67% sulfuric acid), cooling externally as required. After agitating for ½ hour longer the nitrated mass was drowned into about 5,000 cc. of water to precipitate the crude product. The precipitate was removed by filtration and washed nearly free of mineral acid with water. It was then purified by pH fractionation.

The yield was 66.2% effective from 2,5-dichlorobenzoyl chloride with a melting point of 217.3–218.9° C.

Example IX

Example VIII was repeated except in this case the mixed acid and oleum were not premixed but were added simultaneously to the 2,5-dichlorobenzoic acid dissolved in sulfuric acid. The heat given off during the reaction was considerably greater than that in Example VIII.

The yield was 66% effective from 2,5-dichlorobenzoyl chloride with a melting point of 216.5–219.5° C.

Example X

Into the equipment used in Example VIII were charged 649 grams of 93.7% sulfuric acid. There was then charged at 45–50° C., 520 grams of 2,5-dichlorobenzoyl chloride (64% by assay). After the hydrolysis was complete the nitration and purification were done as in Example VIII.

The yield was 65.5% effective from 2,5-dichlorobenzoyl chloride with a melting point of 216.1–218.5° C.

Example XI

A 1-liter flask was charged with 488 grams of 95.3% sulfuric acid and 260 grams of 2,5-dichlorobenzoyl chloride (94.7% by assay). The hydrolysis of the acid chloride was completed at 45–50° C. There were then added 404 grams of a solution made by mixing 276 grams of mixed acid (33% nitric acid and 67% sulfuric acid) and 168 grams of oleum (65% free sulfur trioxide). After the nitrating solution was added, the mixture was agitated for a short time and then poured into 2½ liters of cold water. The crude nitrated product which precipitated was removed by filtering at about 60° C. and washed. It was then purified by pH fractionation.

The yield was 67.8% effective from 2,5-dichlorobenzoyl chloride with a melting point of 216.2–219.7° C.

While the foregoing discussion, equations and examples are illustrative of the several advantages obtained by the method of the present invention in the nitration of 2,5-dichlorobenzoic acid, my experimental work has shown that the use of oleum (65% free sulfur trioxide) and mixed acid as well as the use of a solution of sulfuric acid, sulfur trioxide and nitric is also applicable and advantageous in the nitration of benzoic acid per se, o-, m- and p-chlorobenzoic acid; 2,3-, 2,4-, 2,6-, 3,4- and 3,5-dichlorobenzoic acid and 2,3,4-, 2,3,5-, 2,4,5-, 2,4,6- and 3,4,5-trichlorobenzoic acid for the same reasons as it is for the 2,5-dichlorobenzoic acid.

Example XII

A 200 cc. flask was charged with 64 grams of sulfuric acid 100% and 0.2 cc. water. After heating to 50° C. there was added 25 grams benzoic acid. There was then added, while agitating, 66.8 grams of a mixed acid consisting of 20.32% nitric acid, 25.84% $SO_3$, and 53.84% of sulfuric acid while keeping the temperature at 53–57° C. (The weight ratio of total sulfuric acid to benzoic acid is 4.8:1 or 6.0:1 by moles.) When the nitration was complete, the reaction mass was poured into 550 cc. cold water. The product was removed by filtration and washed with cold water. The yield of nitrobenzoic acid was over 110% effective from the benzoic acid.

Example XIII

A 200 cc. flask was charged with 64 grams sulfuric acid 100% and 0.2 cc. water. Twenty-two grams of p-chlorobenzoic acid was dissolved in the sulfuric acid and then there was added at 53–57° C. 45.8 grams of the same mixed acid used in Example XII. (The weight ratio of total sulfuric acid to chlorobenzoic acid is 4.7:1 or 7.5:1 by moles.) The product was isolated as described in Example XII.

The yield of 4-chloro-3-nitrobenzoic acid was the theoretical quantity (129% effective from the chlorobenzoic acid).

Example XIV

A charge of 32 grams sulfuric acid 100%, 0.1 cc. water and 12 grams of 2,3,6-trichlorobenzoic acid contained in a 100 cc. flask was heated to 55° C. There was then added slowly at 53–57° C., 17.4 grams of the same mixed acid used in Example XII. (The weight ratio of total sulfuric acid to trichlorobenzoic acid is 3.9:1 or 9:1 by moles.) When the reaction was complete, the reaction mixture was drowned into 300 cc. ice and water. The product was removed by filtration and washed with cold water. The yield of nitrated product was 95% effective from the trichlorobenzoic acid.

Example XV

A 100 cc. flask was charged with 32 grams sulfuric acid 100%, 0.1 cc. water and 12 grams 2,4-dichlorobenzoic acid. Then at 53–57° C. was added 20.5 grams of the mixed acid used in Example XII. (The weight ratio of total sulfuric acid to dischlorobenzoic acid is 4.1:1 or 8.0:1 by moles.) After stirring for a short time, the reaction mixture was poured into cold water, filtered and the product washed with cold water. The yield of nitrodichlorobenzoic acid was nearly quantitative.

I claim:
1. The process of mononitrating a sulfuric acid solution of a benzenoid acid selected from the class consisting of benzoic acid, monochloro-, dichloro- and trichlorobenzoic acid at a temperature of 40° to 60° C. by the addition of a mixed acid consisting of 33% nitric acid and 67% sulfuric acid and oleum containing 65% free sulfur trioxide wherein the weight ratio of total sulfuric acid to the said benzenoid acid is 3.33–4.8:1 and wherein the ratio of moles of free sulfur trioxide in the oleum to the said benzenoid acid is approximately 1:1.

2. In the process of claim 1 wherein the said oleum is added prior to the addition of said mixed acid.

3. In the process of claim 1 wherein the said oleum is added at the same time as the said mixed acid.

4. In the process of claim 1 wherein the said oleum is added after the addition of said mixed acid.

5. In the process of claim 1 wherein the said oleum is added intermittently with the said mixed acid.

6. In the proces of claim 1 wherein the said oleum is added as a mixture in said mixed acid.

7. The process of mononitrating a sulfuric acid solution of 2,5-dichlorobenzoic acid at a temperature of 40° to 60° C. by the addition of a mixed acid consisting of 33% nitric acid and 67% sulfuric acid and oleum containing 65% free sulfur trioxide wherein the weight ratio of total sulfuric acid to the said dichlorobenzoic acid is 3.33–4.5:1 and wherein the ratio of moles of free sulfur trioxide in the oleum to the said dichlorobenzoic acid is approximately 1:1.

8. The process of mononitrating a sulfuric acid solution of 2,5-dichlorobenzoic acid at a temperature of 40° to 60° C. by the addition of a mixed acid consisting of 33% nitric acid and 67% sulfuric acid and oleum containing 65% free sulfur trioxide wherein the weight ratio of total sulfuric acid to the said dichlorobenzoic acid is 3.33:1 and wherein the ratio of moles of free sulfur trioxide in the oleum to the said dichlorobenzoic acid is approximately 1:1.

9. The process of mononitrating a sulfuric acid solution of 2,5-dichlorobenzoic acid at a temperature of 40° to 60° C. by the addition of a mixed acid consisting of 33% nitric acid and 67% sulfuric acid and oleum containing 65% free sulfur trioxide wherein the weight ratio of total sulfuric acid to the said dichlorobenzoic acid is 3.6:1 and wherein the ratio of moles of free sulfur trioxide in the oleum to the said dichlorobenzoic acid is approximately 1:1.

References Cited

UNITED STATES PATENTS 3,100,797  8/1963  Harris et al. _____ 260—515

OTHER REFERENCES

Heertjes et al., Rec. Trav. Chim., vol. 73, pp. 287–296, 1954, QD 1R3.

Gillespie et al., Quarterly Reviews (London), vol. 22, pp. 227–286, 1948. QD 1Q9.

LORRAINE A. WEINBERGER, *Primary Examiner.*

T. L. GALLOWAY, *Assistant Examiner.*